United States Patent
Amato et al.

(10) Patent No.: US 12,235,722 B2
(45) Date of Patent: Feb. 25, 2025

(54) APPARATUS FOR REDUNDANT ARRAY OF INDEPENDENT DISKS

(71) Applicant: Micron Technology, Inc., Boise, ID (US)

(72) Inventors: Paolo Amato, Treviglio (IT); Daniele Balluchi, Cernusco sul Naviglio (IT); Danilo Caraccio, Milan (IT); Emanuele Confalonieri, Segrate (IT); Marco Sforzin, Cernusco sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 11 days.

(21) Appl. No.: 18/216,160

(22) Filed: Jun. 29, 2023

(65) Prior Publication Data

US 2024/0004760 A1    Jan. 4, 2024

Related U.S. Application Data

(60) Provisional application No. 63/357,517, filed on Jun. 30, 2022.

(51) Int. Cl.
G06F 11/10    (2006.01)
(52) U.S. Cl.
CPC .................. G06F 11/1076 (2013.01)
(58) Field of Classification Search
None
See application file for complete search history.

(56) References Cited

U.S. PATENT DOCUMENTS

| | | | |
|---|---|---|---|
| 11,687,273 B2 | 6/2023 | Confalonieri et al. | |
| 2013/0024460 A1* | 1/2013 | Peterson | G06F 3/064 707/E17.049 |
| 2016/0179374 A1* | 6/2016 | Berke | G06F 12/0607 711/104 |
| 2018/0225173 A1* | 8/2018 | Baek | G06F 11/1068 |
| 2019/0043600 A1* | 2/2019 | Saileshwar | G06F 21/79 |
| 2021/0119730 A1* | 4/2021 | Das Sharma | H04L 1/0057 |
| 2023/0236913 A1* | 7/2023 | Thompson | G06F 11/0727 714/49 |

OTHER PUBLICATIONS

U.S. Appl. No. 17/831,433, filed Jun. 2, 2022, titled "Write Command Execution for Data Protection and Recovery Schemes", 42 pages.

* cited by examiner

*Primary Examiner* — Guerrier Merant
(74) *Attorney, Agent, or Firm* — Brooks, Cameron & Huebsch, PLLC (57) ABSTRACT

A channel width can depend on a quantity of memory units (e.g., memory dice) that forms a channel as well as a size of the memory units. A memory system can operate with memory units configured to exchange (e.g., transfer to and/or from) data at a rate of smaller granularity that can provide more various options for channel widths, which can further allow a fine-tuned optimization of the memory system in association with its bandwidth and latency in transferring data from and/or to the memory units. The channels whose channel width is fine-tuned with such memory units can be further used to provide a reliability, availability, and serviceability (RAS) protection, such as a redundant array of independent disks (RAID) protection.

20 Claims, 5 Drawing Sheets

APPARATUS FOR REDUNDANT ARRAY OF INDEPENDENT DISKS

PRIORITY INFORMATION

This application claims the benefit of U.S. Provisional Application No. 63/357,517, filed on Jun. 30, 2022, the contents of which are incorporated herein by reference.

TECHNICAL FIELD

The present disclosure relates generally to semiconductor memory and methods, and more particularly, to apparatuses, systems, and methods related to providing redundant array of independent disks (RAID) protection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to providing redundant array of independent disks (RAID) protection for memory system are described. Various embodiments of the present disclosure are directed to a memory system that provides reliability, availability, and serviceability (RAS) protection (e.g., RAID protection) and is compliant with various requirements of a protocol, such as a compute express link (CXL) (e.g., CXL 3.0 that is built based on Peripheral Component Interconnect Express (PCIe) 6.0)).

In one aspect, the memory system includes memory units (e.g., memory dice) each configured to provide four bits per beat (referred to as "×4 mode"). In another aspect, the memory system can include a separate memory die dedicated for non-user data (alternatively referred to as "auxiliary data"). These aspects of the memory architecture as combined can allow the memory system to operate to meet various requirements and/or goals of the CXL, which can require a memory system to operate with high reliability (by providing a chip kill scheme), high bandwidth, low latency, a capability to manage auxiliary data (e.g., metadata), and/or a capability to support advanced security features (e.g., security features involving message authentication code (MAC) and/or Advanced Encryption Standard (AES)).

By using memory dice with a ×4 mode as compared to the other modes having a larger granularity (e.g., ×8 or ×16 mode), the operation of the memory system can be fine-tuned, which provides a better optimization of the operation that the ×8 or ×16 mode may not be capable of providing. For example, the RAS (Reliability, Availability, and Serviceability) protection (e.g., chip kill scheme) can be provided by accessing a channel constituting a configurable number of memory dice each operating with a particular mode. In some embodiments, the RAS protection can be provided with two 20-bit wide channels (with each channel including five memory dice with the ×4 mode) that might provide a better optimization of the memory system (in terms of system bandwidth and/or latency) over 16-bit or 24-bit wide channels that memory dice with a ×8 or ×16 mode are capable of providing. These memory dice of a ×4 mode and providing 40-bit wide channels can be used for providing the RAS protection, such as a RAID protection. As used herein, a RAID protects the memory system even if a constituent chip (e.g., memory die) is damaged; thereby, avoiding a situation of one of the chips being a single point of failure (SPOF) of the memory system.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transferred, read, transmitted, received, or exchanged by electronic signals (e.g., current, voltage, etc.).

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
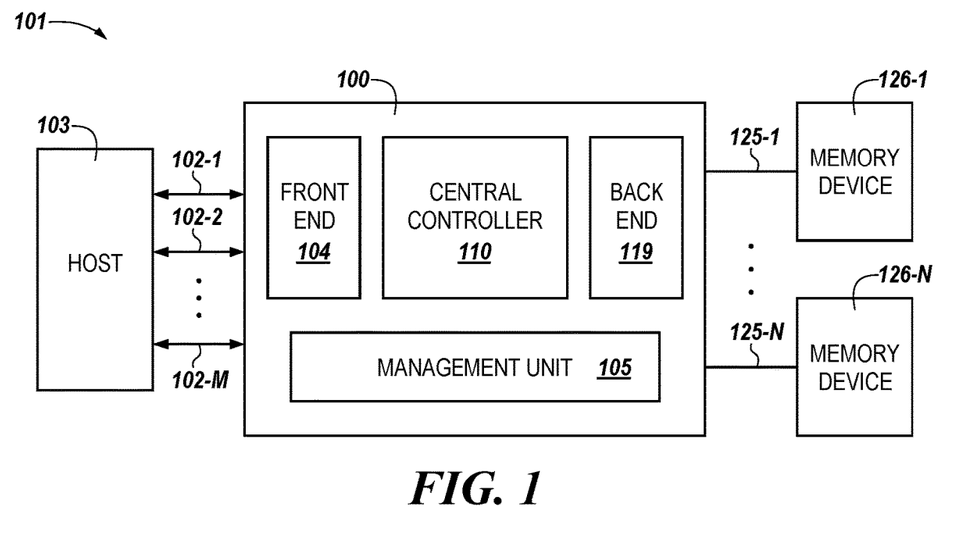
FIG. 1 is a functional block diagram of a computing system including a memory controller in accordance with a number of embodiments of the present disclosure.

FIG. 1 is a functional block diagram of a computing system 101 (alternatively referred to as "memory system") including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. As an example, the interface of the front end 104 can be a PCIe 5.0 or 6.0 interface coupled to the I/O lanes 102. In some embodiments, the memory controller 100 can receive access requests involving the memory device 226 via the PCIe 5.0 or 6.0 interface 206 according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error recovery information based on data received from the host 103. The central controller portion 110 can perform error detection operations and/or error recovery operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An error recovery operation (e.g., a chip kill operation, such as a RAID operation) can be performed to recover data from one or more memory dice (e.g., one or more memory dice 327-1, . . . , 327-9) despite of its complete failure.

A chip kill operation protects the memory system even if a constituent chip (e.g., the memory device 126) is damaged; thereby, avoiding a situation of one of the chips being a single point of failure (SPOF) of the memory system. Often, the chip kill capability is provided through various error correction code (ECC) schemes including a "Redundant Array of Independent Disks" (RAID) scheme, which allow data recovery of the damaged chip by reading all of the constituent chips of the memory system.

The chip kill can involve parity data (e.g., RAID parity) that are specifically designed for data recovery of the damaged chip. The user data that share the same parity data can be referred to as being grouped together.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types of data buses, such as a four-pin data bus (e.g., data input/output (DQ) bus) and a one-pin data mask inversion (DMI) bus, among other possible buses.

The memory devices 126 can be various/different types of memory devices. For instance, the memory device can include RAM, ROM, DRAM, SDRAM, PCRAM, RRAM, and flash memory, among others. In embodiments in which the memory device 126 includes persistent or non-volatile memory, the memory device 126 can be flash memory devices such as NAND or NOR flash memory devices. Embodiments are not so limited, however, and the memory device 126 can include other non-volatile memory devices such as non-volatile random-access memory devices (e.g., non-volatile RAM (NVRAM), ReRAM, ferroelectric RAM (FeRAM), MRAM, PCRAM), "emerging" memory devices such as a ferroelectric RAM device that includes ferroelectric capacitors that can exhibit hysteresis characteristics, a memory device with resistive, phase-change, or similar memory cells, etc., or combinations thereof.

As an example, a FeRAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

In another example, the memory devices 126 can be dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 primarily in forms of a memory transfer block (MTB) that includes a number of user data blocks (UDBs). As used herein, the term "MTB" refers to a group of UDBs that are grouped with a same parity data block (PDB) (e.g., share a same PDB); therefore, are transferred together from a cache (e.g., the cache 212) and/or memory devices 126 for each read or write command. For example, the group of UDBs of the same MTB can be transferred to/from (e.g., written to/read from) the memory devices 126 via the channels 125 over a predefined burst length (e.g., a 32-bit BL) that the memory controller 100 operates with.

A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers. Although embodiments are not so limited, a bus width corresponding to a size of each beat can be 4 (e.g., alternatively referred to as "×4"), 8 (e.g., alternatively referred to as "×8"), and/or 16 bits (e.g., alternatively referred to as "×16").

As used herein, the term "PDB" refers to a data block containing parity data (e.g., LPCK parity data in forms of one or more parity symbols) configured for a chip kill (e.g., LPCK and RAID) operation on UDBs that are grouped with the PDB. As further described herein, an MTB can be in a plain text or cypher text form depending on whether the MTB has been encrypted at the memory controller 100 (e.g., the security encoder 217-1 and/or 217-1).

As used herein, the term "UDB" refers to a data block containing host data (e.g., received from the host 103 and alternatively referred to as "user data"). In some embodiments, host data included in an UDB can be in forms of one or more data symbols (e.g., multi-bit symbols), which can be a non-binary symbol. For example, non-binary symbol(s) having N bits can be one of $2^N$ elements of a finite Galois field. While, an UDB can correspond to a size of a host read and/or write request, an UDB can also be a unit of read and/or write access to the memory devices. Along with the UDB, a PDB can be also transferred between the back end portion 119 and the memory devices 126. The host data or the parity data of a single UDB or PDB can correspond to multiple codewords (e.g., 64 codewords).

Along with the UDB, other "extra" bits of data (e.g., other data in addition to data corresponding to an UDB and alternatively referred to as "auxiliary data") can also be transferred between the back end portion 119 and the memory devices 126. The extra data can include data used to correct and/or detect errors in UDB and/or authenticate and/or check data integrity of the UDB, and/or metadata, although embodiments are not so limited. Further details of the extra bits are illustrated and described in connection with FIGS. 2-5.

In some embodiments, some (e.g., one or more) memory devices 126 can be dedicated for PDBs. For example, memory devices configured to store UDBs can be different from a memory device (e.g., one or more memory devices) configured to store PDBs.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
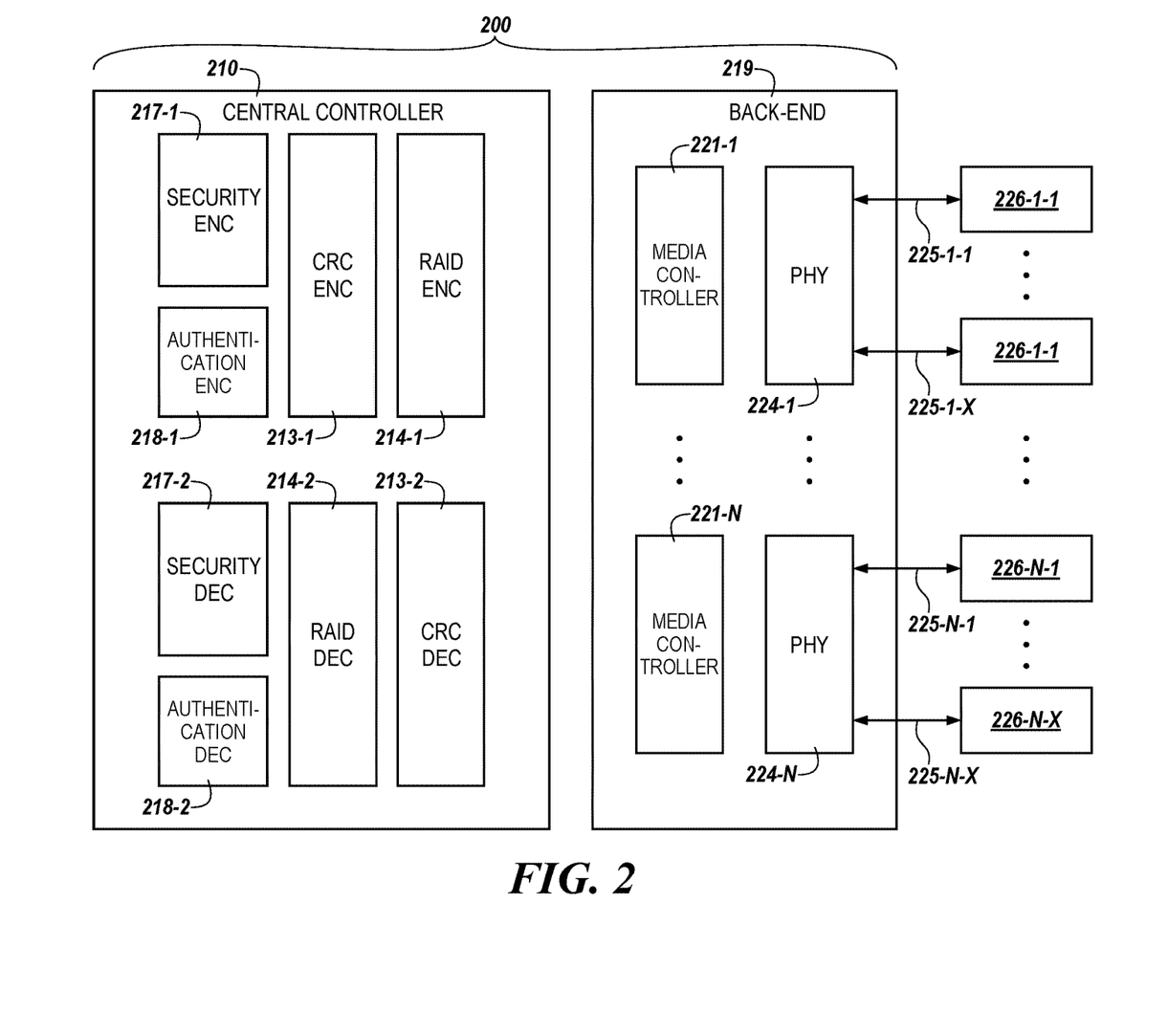
FIG. 2 is a functional block diagram of a memory controller having a redundant array of independent disks (RAID) encoder/decoder in accordance with a number of embodiments of the present disclosure.

FIG. 2 is a functional block diagram of a memory controller 200 for cache line data protection in accordance with a number of embodiments of the present disclosure. The memory controller 200, the central controller portion 210, the back end portion 219, and the memory devices 226 illustrated in FIG. 2 are analogous to the memory controller 100, the central controller portion 210, the back end portion 119, and the memory devices 126 illustrated in FIG. 1.

Data (e.g., an UDB in "plain text" form) received (e.g., from the host 103) at the memory controller 200 as a part of a write command can be transferred to the other components (e.g., a security encoder 217-1 and/or an authentication encoder 218-1) of the central controller portion 210 to be ultimately stored in the memory device 226. As used herein, an UDB in plain text form can be alternatively referred to as an "unencrypted UDB", which can be further interchangeably referred to as a "decrypted UDB" or an "unencrypted version of an UDB". In some embodiments, host read and write commands of CXL memory systems can be a size of UDB, such as 64 bytes. For example, data can be requested by the host in a granularity of an UDB.

The central controller portion 210 further includes a security encoder 217-1 (e.g., paired with a security decoder 217-2) to encrypt data (e.g., an UDB corresponding to a write command) before transferring the data to a CRC encoder 213-1 (to write the data to the memory devices 226). Although embodiments are not so limited, the pair of security encoder/decoder 217 can operate using an AES encryption/decryption (e.g., algorithm). Unencrypted data (e.g., plain text) can be converted to cypher text via encryption by the security encoder 217-1. As used herein, the UDB in cypher text form can be alternatively referred to as an "encrypted UDB", which can be alternatively referred to as an "encrypted version of an UDB". The central controller portion 210 further includes an authentication encoder 218-1 to generate authentication data based on data received from the cache 212. Although embodiments are not so limited, the authentication data generated at the authentication encoder 218-1 can be MAC, such as KECCAK MAC (KMAC) (e.g., SHA-3-256 MAC).

In some embodiments, the MAC generated at the authentication encoder 218-1 can be calculated based on trusted execution environment (TEE) data (alternatively referred to as "TEE flag"), Host Physical Address (HPA) (e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authentication encoder 218-1 can operate in parallel. For example, the data stored in the cache 212 and that are in plain text form can be input (e.g., transferred) to both the security encoder 217-1 and the authentication encoder 218-1. In some embodiments, a security key ID can be further input (along with the data in plain text form) to the security encoder 217-1. Further, in some embodiments, a security key ID, TEE flag, and an HPA associated with a host write command can be further input (along with the data in plain text form) to the authentication encoder 218-1.

The central controller portion 210 includes a CRC encoder 213-1 (e.g., paired with a CRC decoder 213-2) to generate error detection information (e.g., alternatively referred to as CRC media (CRCm)) based on the data (e.g., the UDB corresponding to the write command) received from the security encoder 217-1. The data transferred to the CRC encoder 213-1 from the security encoder 217-1 can be in cypher text form as the data were previously encrypted at the security encoder 217-1. The error detection information generated at the CRC encoder 213-1 can be a check value, such as CRC data.

The central controller portion 210 includes RAID encoder 214-1 (e.g., paired with a RAID decoder 214-2) to generate and/or update RAID parity data (e.g., a PDB) based at least in part on data (e.g., one or more UDBs corresponding to a cache line) received from the CRC encoder 213-1. The data transferred to the RAID encoder 214-1 from the CRC encoder 213-1 can be in cypher text form as the data were encrypted at the security encoder 217-1.

The RAID encoder 214-1 can update the PDB to conform to new UDB received as part of a write command from the host. To update the PDB, an old UDB (that is to be replaced with the new UDB) and an old PDB (of a same stripe as the old UDB) can be read (e.g., transferred to the RAID encoder 214-1) and compared (e.g., XORed) with the new UDB, and a result of the comparison (e.g., the XOR operation) can be further compared (e.g., XORed) with an old PDB (that is to be updated) to result in a new (e.g., updated) PDB.

"Extra" bits of data (alternatively referred to as "auxiliary data") can be transferred (along with the UDB corresponding to the write command) to the back end portion 219 to be ultimately transferred and written to the memory devices 226. The "extra" bits can include RAID parity data (e.g., in forms of a PDB) generated at the RAID encoder 214-1, error detection information (e.g., CRC data) generated at the CRC encoder 213-1, and/or authentication data (e.g., MAC data) generated at the authentication encoder 218-1 as well as metadata and/or TEE data.

As shown in FIG. 2, the memory controller 200 can include a back end portion 219 coupled to the central controller portion 210. The back end portion 219 can include media controllers 221-1, . . . , 221-N. The back end portion 219 can include PHY memory interfaces 224-1, . . . , 224-N, which are coupled to a respective number of memory devices 226 via channels 225. For example, the PHY memory interface 224-1 is coupled to the memory devices 226-1-1, . . . , 226-1-X, while the PHY memory interface 224-N is coupled to the memory devices 226-N-1, . . . , 226-N-X. Each physical interface 224 is configured to be coupled to a respective number of memory devices 226 that forms a data protection (RAID) channel.

The channels 225 can include a number of separate data protection channels (alternatively referred to as RAS (Reliability, Availability, and Serviceability) channel), which can each comprise a number of memory devices (e.g., dice) 226 accessed together in association with a particular data protection scheme (e.g., RAID, LPCK, etc.). The data protection channels can include RAID channels. As used herein, the term "RAID channel" refers to one or more channels (e.g., channels 125 and/or illustrated in FIGS. 1 and 2, respectively) that are accessed together for RAID access. Alternatively speaking, a RAID channel can be an access unit for transfer of a single RAID stripe. As one example, the channels 225 might comprise four separate data protection channels 225 each comprising ten memory devices 226. For example, as illustrated in FIG. 2, one RAID channel includes channels 225-1-1, . . . , 225-1-X (along with memory devices 226-1-1, . . . , 226-1-X), while a different RAID channel includes channels 225-N-1, . . . , 225-N-X (along with memory devices 226-1-1, . . . , 226-1-X).

The media controllers 221-1, . . . , 221-N can be used substantially simultaneously to drive the channels 225-1-1, . . . , 225-1-X and 225-N-1, . . . , 225-N-X simultaneously. In at least one embodiment, each of the media controllers 221 can receive a same command and address and drive the channels 225 substantially simultaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be contemporaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

The PHY memory interfaces 224 can be an LPDDRx memory interface. In some embodiments, each of the PHY memory interfaces 224 can include data and DMI pins. For example, each PHY memory interface 224 can include four data pins (DQ pins) and one DMI pins. The media controllers 221 can be configured to exchange data (e.g., UDB and/or auxiliary data) with a respective number of memory devices 226 via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In some embodiments, DMI and DQ pins of a same memory die can be simultaneously utilized such that data can be transferred and/or exchanged from the memory die simultaneously via the DMI and DQ pins.

The memory devices 226 each include at least one array of memory cells. In some embodiments, the memory devices 226 can be different types of memory. The media controllers 221 can be configured to control at least two different types of memory. For example, the memory device 226-1-1 can be LPDDRx memory operated according to a first protocol and the memory device 226-N-1 can be LPDDRx memory operated according to a second protocol different from the first protocol. In such an example, the first media controller 221-1 can be configured to control a first subset of the memory devices 226-1-1 according to the first protocol and the second media controller 221-N can be configured to control a second subset of the memory devices 226-N-1 according to the second protocol.

Data (e.g., an UDB corresponding to a read command) stored in a memory device 226 can be transferred to the back end portion 219 to be ultimately transferred to the host (e.g., the host 103 illustrated in FIG. 1). Along with the UDBs, other "extra" bits of data (alternatively referred to as "auxiliary data") can be transferred from a different memory device 226 (e.g., a memory device 226 different than the memory device 226 storing the UDB) to the back end portion 219 as well. The "extra" bits can include RAID parity data generated at the RAID encoder 214-1 (e.g., in forms of a PDB), error detection information generated at the CRC encoder 213-1, parity data (e.g., symbols) generated at the RAID encoder 214-1, and authentication data generated at the authentication encoder 218-1 as well as metadata and/or TEE data. As described herein, the UDBs transferred to the back end portion 219 can be in cypher text form.

Data (e.g., an UDB corresponding to a read command) transferred to the back end portion 219 can be transferred to the CRC decoder 213-2 along with at least the error detection information previously generated at the CRC encoder 213-1. At the CRC decoder 213-2, an error detection operation can be performed to detect any errors in the UDB using the error detection information, such as CRC data.

The CRC decoder 213-2 can operate on data in conjunction with the RAID decoder 215-2 to provide check-and-recover correction. More specifically, the CRC decoder 213-2 can detect an error in the data (e.g., the UDB corresponding to the read command), which triggers an error recovery process (e.g., RAID process) by the RAID decoder 215-2. If the CRC decoder 213-2 indicates no errors in the data, the RAID decoder 215-2 can be bypassed and the RAID process may not be performed.

When the RAID process is triggered, the RAID operation performed on the UDB can recover a subset of the UDB that was transferred from one (e.g., failed) memory device 226 (e.g., memory die) based on the other subsets of the UDB transferred from the other memory devices (e.g., memory dice). Since all the subsets (of the UDB) is collectively input (e.g., transferred) to the CRC decoder (e.g., the CRC decoder 213-2 illustrated in FIG. 2) and collectively checked for one or more errors (alternatively referred to as "locked-RAID"), the CRC check performed at the CRC decoder may not indicate which subset has one or more errors. Therefore, the triggered RAID process involves a number of RAID operations that can be respectively and independently performed on each subset to correct the one subset that indeed has the errors. For example, considering an UDB is received from eight memory devices 226, eight RAID operations can be performed (e.g., in parallel) respectively on each subset (corresponding to each memory dice) of the UDB.

In some embodiments, the RAID decoder 214-2 can further include a CRC decoder that provides the same functionality as the CRC decoder 213-2, but to perform an error detection operation (e.g., to CRC-check) on data subsequent to the RAID operations. Continuing with the above example, the CRC check can be performed using the CRC decoder within the RAID decoder 214-2 on results of the eight RAID operations to determine which one of the RAID operations actually corrected the errors. One of the results (e.g., the UDB with the errors corrected properly) can be further sent to the security decoder 217 and/or authentication decoder 218.

The data (e.g., the UDB corresponding to the read command) can be further transferred to the security decoder 217-2 and to the authentication decoder 218-2 along with at least the authentication data previously generated at the authentication encoder 218-1. At the security decoder 217-2, the data can be decrypted (e.g., converted from the cypher text back to the plain text as originally received from the host). The security decoder 217-2 can use an AES decryption to decrypt the data.

At the authentication decoder 218-2, the data that were decrypted at the security decoder 217-2 can be authenticated (and/or checked for data integrity) using the authentication data (e.g., MAC data) that were previously generated at the authentication encoder 218-1. In some embodiments, the authentication decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is transferred to the host 103. If the calculated MAC and transferred MAC do not match, the host 103 is notified of the mismatch (and/or the poison). The data (e.g., UDBs corresponding to a cache line) authenticated (and/or checked for data integrity) at the authentication decoder 218-2 can be transferred to the host 103.

The controller 200 that operates without a cache can provide a steady latency as compared to the other CXL controllers operating with a cache. As an example, when executing a read command, the CXL controller operating with the cache can have 30 nanoseconds (ns) of latency at front end portion (e.g., the front end portion 104 illustrated in FIG. 1), 30 ns of latency at a central controller portion (e.g., the central controller portion 110 and/or 210 illustrated in FIGS. 1 and 2, respectively), 30 ns of latency at a back end portion (e.g., the back end portion 119 and/or 219 illustrated in FIGS. 1 and 2, respectively), and 42 ns of latency at a memory device (e.g., the memory device 126 and/or 226 illustrated in FIGS. 1 and 2, respectively and operating according to LPDDR 5), which results in 132 ns of latency at the controller 200 in case of a cache miss, 51 ns of latency at the controller 200 in case of a cache hit, and 100 ns of latency at the controller 200 in case of 40% cache hit rate. In contrast, when executing a read command, the CXL controller of the present disclosure that operates without the cache can have 30 nanoseconds (ns) of latency at front end portion (e.g., the front end portion 104 illustrated in FIG. 1), 23 ns of latency at a central controller portion (e.g., the central controller portion 110 and/or 210 illustrated in FIGS. 1 and 2, respectively), 15 ns of latency at a back end portion (e.g., the back end portion 119 and/or 219 illustrated in FIGS. 1 and 2, respectively), and 32 ns of latency at a memory device (e.g., the memory device 126 and/or 226 illustrated in FIGS. 1 and 2, respectively and operating according to DDR 5), which results in 100 ns of steady latency that can be beneficial over the CXL controller having the cache at least in the event that the cache hit rate is at least equal to or over 40%.

Figure 3:
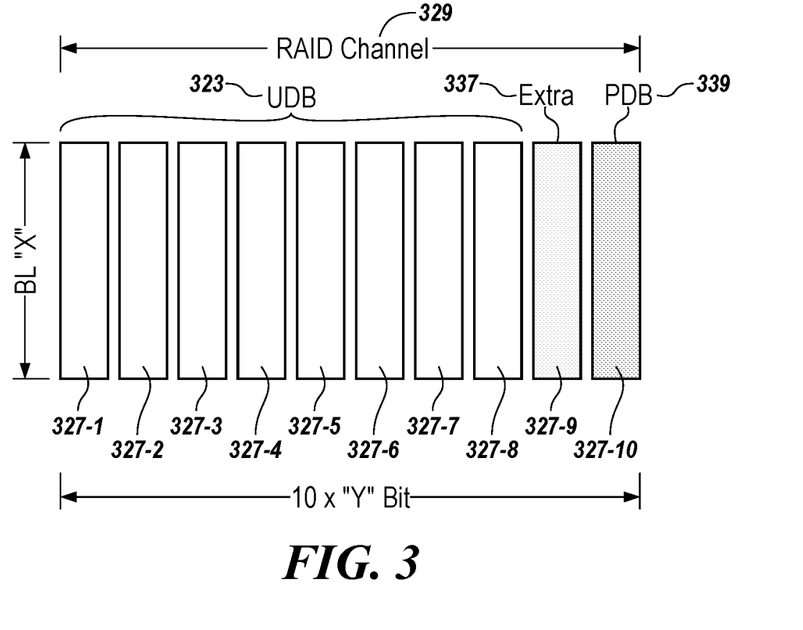
FIG. 3 is a block diagram of memory dice corresponding to a data protection channel in accordance with a number of embodiments of the present disclosure.

FIG. 3 is a block diagram of memory dice corresponding to a data protection channel (e.g., a RAID channel) in accordance with a number of embodiments of the present disclosure. The diagram illustrates ten memory dice 327-1, ..., 327-10. Each memory die 327 can be configured to store a die transfer block (DTB), which can be transferred to or from the memory die (e.g., to the memory controller 100 and/or 200 illustrated in FIGS. 1 and 2, respectively) over a predefined burst length. For example, a DTB can be transferred over X-bit burst length with Y-bit data transfer (e.g., via Y number of DQ pins) for each beat of the X-bit burst length, which amounts to 10*Y bits per beat from ten memory dice 327-1, ..., 327-10 and Y*X bits of user data over the X-bit burst length. In some embodiments, the memory die 327 can also transfer an amount of bits of auxiliary data (e.g., via a number of DMI pins) over the X-bit burst length. More particularly, over 32-bit burst length, 16 bytes of user data (e.g., a portion of the UDB 323) can be transferred from each memory die 327 via 32 4-bit data transfers (alternatively referred to as "x4 mode").

Although embodiments are not so limited, four memory dice 327 can correspond to (e.g., a channel width) of the channel 125 and/or 225 illustrated in FIGS. 1 and 2, respectively. For example, memory dice 327-1, ..., 327-4 can correspond to one channel 125, 225; memory dice 327-6, ..., 327-8 can correspond to another channel 125, 225; and memory dice 327-9 and 327-10 can correspond to (a half of) a different channel 125, 225. Alternatively, memory dice 327-9 and 327-10 can correspond to different channels 125, 225. Accordingly, each channel 125, 225 can be 4*Y-bit wide (e.g., 16-bit wide).

The ten memory dice 327-1, ..., 327-10 can correspond to a same memory rank of memory device (e.g., the memory devices 126 and/or 226 illustrated in FIGS. 1 and 2). As used herein, the term "memory ranks" generally refers to a plurality of memory chips (e.g., memory dice) that can be accessed simultaneously. Accordingly, ten memory dice 327-1, ..., 327-10 can be accessed simultaneously (e.g., "substantially simultaneously" as defined herein).

The diagram shows eight memory dice 327-1, ..., 327-8 (of RAID channel 329) over which an UDB 323 can be stored, although embodiments are not limited to a particular quantity of memory dice over which a single UDB can be stored. In a particular example, given that each memory die is configured to store 16 bytes of a respective portion of the UDB 323, which amounts to 64 bytes of UDB 323 over the memory dice 327-1, ..., 327-8.

The diagram further shows a memory die 327-9, in which auxiliary data (shown as "EXTRA" in FIG. 3). The auxiliary data that can be stored in and/or transferred to or from the memory die 327-9 can include authentication data (e.g., MAC generated at the authentication encoder 218-1 illustrated in FIG. 2), error detection data (e.g., CRC generated at the CRC encoder 213-1), TEE data, and metadata. The diagram further shows a memory die 327-10, in which a PDB 339 including RAID parity data can be stored, although embodiments are not limited to a particular quantity of memory dice over which a PDB can be stored.

The memory dice 327-1, ..., 327-10 can correspond to a data protection channel, such as a RAID channel 329; therefore, the RAID channel 329 can be 10*Y-bit wide (corresponding to ten memory dice). Data stored in the memory dice 327-1, ..., 327-10 can also be a data transfer unit between the memory device (e.g., the memory device 126 and/or 226 illustrated in FIGS. 1 and 2) and the memory controller (e.g., the memory controller 100 and/or 200 illustrated in FIGS. 1 and 2). For example, an UDB 323 as well as auxiliary data 337 and an PDB 339 can be transferred together in response to a host read command to access the UDB 323.

The memory system (e.g., the memory system 101) can include a number of RAID channels (e.g., each corresponding to the RAID channel 329). Although embodiments are not so limited, the memory system can include four RAID channels (for CXL 2.0 with memory dice operating according to DDR 4800 designed to provide 4.8 gigatransfers/second (GT/s)) and three RAID channels (for CXL 2.0 with memory dice operating according to DDR 6400 designed to provide 6.4 gigatransfers/second (GT/s)) to meet the bandwidth requirement of CLX 2.0 of 45 GB/s, and eight RAID channels (for CXL 3.0 with memory dice operating according to DDR 4800) and six RAID channels (for CXL 3.0 with memory dice operating according to DDR 6400) to meet the bandwidth requirement of CXL 3.0 of 90 GB/s.

In a non-limiting example, an apparatus (e.g., the computing device 101 illustrated in FIG. 1) can include a first number of memory units (e.g., the memory dice 327-1, ..., 327-8 illustrated in FIG. 3) configured to store a user data block (UDB) units (e.g., the UDB 323 and/or 423 illustrated in FIGS. 3 and 4, respectively) corresponding to a unit of host access. The apparatus can further include a second number of memory units (e.g., the memory die 327-9 illustrated in FIG. 3) that are simultaneously accessible with the first number of memory units and configured to store auxiliary data (e.g., the auxiliary data 337 illustrated in FIG. 3) corresponding to the UDB. The auxiliary data can include at least authentication data for protection of data integrity and authenticity of the UDB. The apparatus can further include a third number of memory units (e.g., the memory die 327-10 illustrated in FIG. 3) that are simultaneously accessible with the first number of memory units and configured to store parity data (e.g., the PDB 339 illustrated in FIG. 3) corresponding to the UDB.

In some embodiments, the parity data can correspond to redundant array of independent disks (RAID) parity data to recover a subset (e.g., data stored in one of the memory dice 327-1, ..., 327-8 illustrated in FIG. 3) of the UDB corresponding to one memory unit of the first number of memory units. Each memory unit of the first, the second, or the third number of memory units can be configured to transfer four bits of data per each beat.

In some embodiments, a first portion of the first number (e.g., the memory dice 327-1, ..., 327-4 illustrated in FIG. 3) of memory units corresponds to one double data rate (DDRx) channel (e.g., the channel 125 and/or 225 illustrated in FIGS. 1 and 2, respectively). Further, a second portion (e.g., the memory dice 327-4, ..., 327-8 illustrated in FIG. 3) of the first number of memory units corresponds to a different DDRx channel (e.g., the channel 125 and/or 225 illustrated in FIGS. 1 and 2, respectively).

In some embodiments, the apparatus can include a Compute Express Link (CXL)-compliant memory system (e.g., the computing system 101 illustrated in FIG. 1) that includes the first, the second, and the third number of memory units. In this example, the memory system can be configured to operate according to a CXL 3.0 protocol. In some embodiments, the auxiliary data can further include error detection information generated based on the UDB. In this example, the error detection information corresponds to cyclic redundancy check (CRC) data.

Figure 4:
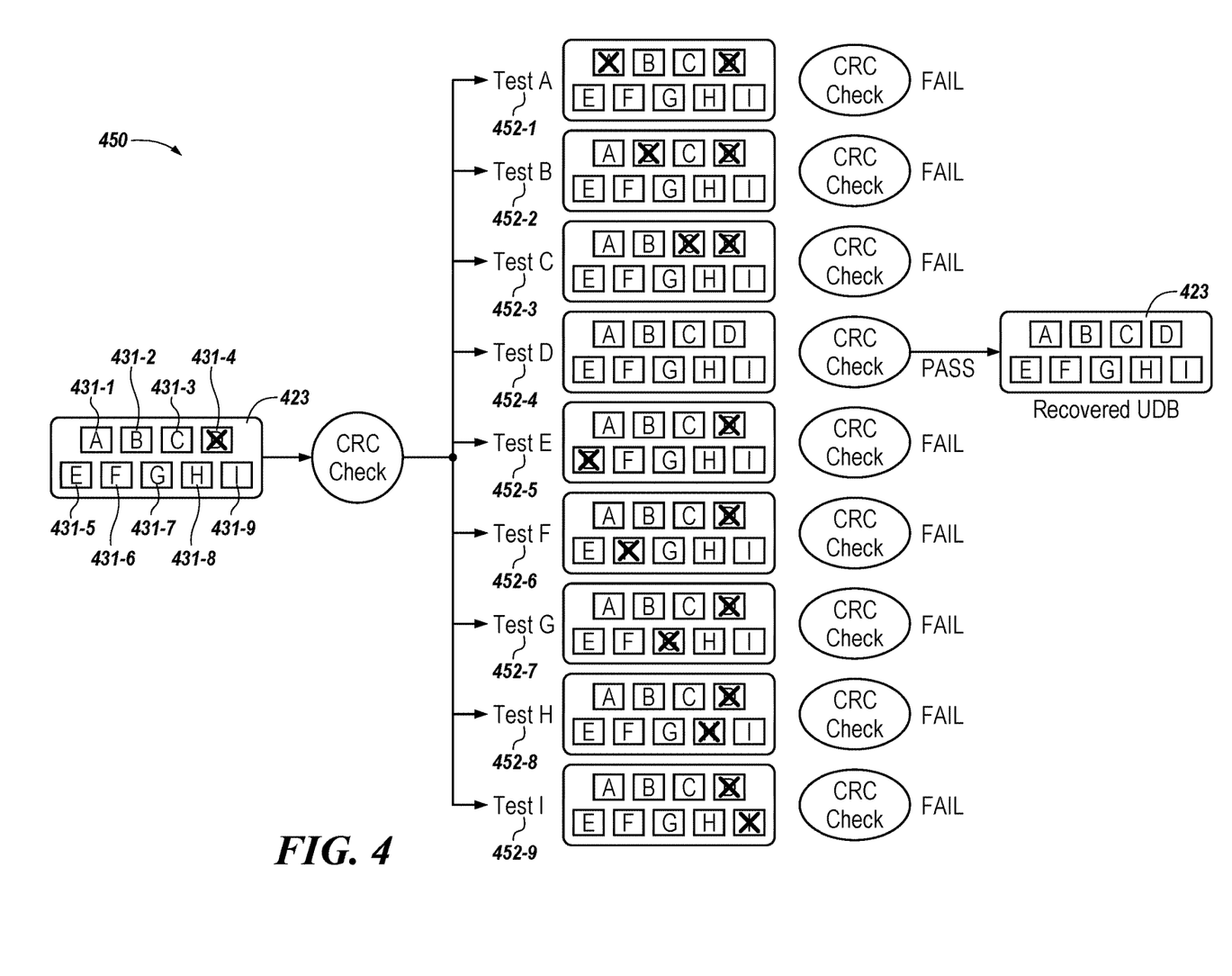
FIG. 4 is a block diagram schematically illustrating a locked-RAID process for data protection of subsets of a user data block (UDB) in accordance with a number of embodiments of the present disclosure.

FIG. 4 is a block diagram 450 schematically illustrating a locked-RAID process for data protection of subsets of an UDB 423 in accordance with a number of embodiments of the present disclosure. The UDB 423 can be analogous to the UDB 323 illustrated in FIG. 3.

As illustrated in FIG. 4, the UDB 423 includes nine data subsets (alternatively referred to as "subsets" herein), such as subsets 454-1 (subset "A" shown in FIG. 4), 454-2 (subset "B" shown in FIG. 4), 454-3 (subset "C" shown in FIG. 4), 454-4 (subset "D" shown in FIG. 4), 454-5 (subset "E" shown in FIG. 4), 454-6 (subset "F" shown in FIG. 4), 454-7 (subset "G" shown in FIG. 4), 454-8 (subset "H" shown in FIG. 4), and 454-9 (subset "I" shown in FIG. 4), illustrated in FIG. 4 can respectively correspond to memory dice (e.g., the memory dice 327-1, . . . , 327-9 illustrated in FIG. 3) of a RAID channel (e.g., the RAID channel 329 illustrated in FIG. 3) that can be error-recovered using a PDB (e.g., the PDB 339 illustrated in FIG. 3).

FIG. 4 illustrates an example scenario, in which the subset "D" includes one or more errors that caused a failure of a CRC check (e.g., alternatively referred to as an error detection operation) performed at the CRC decoder (e.g., the CRC decoder 213-2 illustrated in FIG. 2, respectively). At the RAID decoder 214-2, one or more RAID operations are performed (e.g., in serial or in parallel) on nine different combinations/scenarios, as further described below.

For example, a RAID operation 452-1 (shown as "TEST A" in FIG. 4) is performed based on postulation that the subset "A" has caused the failure of the CRC check; a RAID operation 452-2 (shown as "TEST B" in FIG. 4) is performed based on postulation that the subset "B" has caused the failure of the CRC check; a RAID operation 452-3 (shown as "TEST C" in FIG. 4) is performed based on postulation that the subset "C" has caused the failure of the CRC check; a RAID operation 452-4 (shown as "TEST D" in FIG. 4) is performed based on postulation that the subset "D" has caused the failure of the CRC check; a RAID operation 452-5 (shown as "TEST E" in FIG. 4) is performed based on postulation that the subset "E" has caused the failure of the CRC check; a RAID operation 452-6 (shown as "TEST F" in FIG. 4) is performed based on postulation that the subset "F" has caused the failure of the CRC check; a RAID operation 452-7 (shown as "TEST G" in FIG. 4) is performed based on postulation that the subset "G" has caused the failure of the CRC check; a RAID operation 452-8 (shown as "TEST H" in FIG. 4) is performed based on postulation that the subset "H" has caused the failure of the CRC check; and a RAID operation 452-9 (shown as "TEST I" in FIG. 4) is performed based on postulation that the subset "I" has caused the failure of the CRC check.

The UDBs 423 with the RAID operations 452 performed can be respectively checked for errors (e.g., via respective CRC checks). As illustrated in FIG. 4, the UDB 423 with the RAID operation 452-4 passes the CRC check because the RAID operation 452-4 performed to recover the subset "D" correctly recovered the UDB 423, while the other RAID operations 452-1, . . . , 452-3 and 452-5, . . . , 452-9 missed to recover the subset "D", but rather further causes errors in respective subsets attempted to be recovered at the respective RAID operations 452-1, . . . , 452-3 and 452-5, . . . , 452-9.

The RAID operations 452 can be performed in various manners in conjunction with one or more CRC checks. In one example, the RAID operations 452 are performed sequentially with a respective CRC check performed subsequent to each RAID operation. For example, the RAID operations 452 can be performed in a sequence of 452-1 to 452-4 with four CRC checks performed subsequent to each RAID operations 452-1, 452-2, 452-3, and 452-4. Since the CRC check performed subsequent to the RAID operation 452-4 will say "pass" (e.g., no errors in the subsets 431), the RAID process is completed and the RAID operations 452-5, . . . , 452-9 need not be performed. In another example, the RAID operations 452 are performed in parallel on (e.g., copies of) the subsets 431-1, . . . , 431-9. In this example, the CRC checks are performed respectively for the RAID operations 452 and the copy of the UDB 423 (with the RAID operation 452-4 performed) with "pass" will be further transferred to the security decoder (e.g., the security decoder 217-2 illustrated in FIG. 2).

In another non-limiting example, an apparatus (e.g., the computing device 101 illustrated in FIG. 1) can include a controller (e.g., the controller 100 and/or 200 illustrated in FIGS. 1 and 2, respectively) and a plurality of memory units (e.g., the memory dice 327 illustrated in FIG. 3) coupled to the controller via a plurality of channels (e.g., the channels 125 and/or 225 illustrated in FIGS. 1 and 2, respectively). The plurality of channels can be configured to store a number of user data blocks (UDBs) (e.g., the UDB 323 and/or 423 illustrated in FIGS. 3 and 4, respectively) and each UDB of the number of UDBs corresponds to a data transfer unit between the controller and the plurality of memory units.

In response to receipt of a host read command to access a first UDB (e.g., the UDB 323 and/or 423 illustrated in FIGS. 3 and 4, respectively) of the number of UDBs from a first number of memory units (e.g., the memory dice 327-1, . . . , 327-8 illustrated in FIG. 3) of the plurality of memory units, the controller can be configured to read the UDB from the first memory unit. The controller can be further configured to read, simultaneously with read of the UDB, error detection information (e.g., CRC data generated at the CRC encoder 213-1) corresponding to the UDB from a second memory unit (e.g., the memory die 327-9 illustrated in FIG. 3) of the plurality of the memory units to perform an error detection operation (e.g., CRC check) on the UDB. The controller can be further configured to read, simultaneously with read of the UDB, a parity data block (PDB) (e.g., the PDB 339 illustrated in FIG. 3) including redundant array of independent disks (RAID) parity data from a third memory unit (e.g., the memory die 327-10 illustrated in FIG. 3) of the plurality of memory units to perform a RAID operation on the UDB in response to the error detection operation indicating a number of errors in the UDB.

In some embodiments, the controller can be configured to perform each RAID operation of a number of RAID operations (e.g., the RAID operations 452-1, . . . , 452-9 illustrated in FIG. 4) to recover a respective memory unit of the first number of memory units. In this example, the controller can be configured to perform, using the error detection operation, a number of error detection operations (e.g., CRC check subsequent to the RAID operations 452-1, . . . , 452-9) respectively on results of the number of RAID operations using the error detection operation to determine one of the results a respective one of the number of error detection operations indicated as not having a number of errors.

In some embodiments, the controller can be configured to read data from the first number of memory units, the second memory unit, or the third memory unit at a rate of four bits per beat. In some embodiments, the controller can be a Compute Express Link (CXL)-compliant controller. The controller can be configured to operate according to a CXL 3.0 protocol.

In some embodiments, the controller can be configured to read data from the first number of memory units, the second memory unit, and the third memory unit via a respective number of data input/output (DQ) pins. In some embodiments, each memory unit of the first and the second number of memory units can correspond to a memory die.

In some embodiments, the controller can be further configured to read, simultaneously with reading the UDB, authentication data (e.g., generated at the RAID encoder 214-1 illustrated in FIG. 2). In this example, the authentication data can include authentication code (MAC) data.

In another non-limiting example, an apparatus (e.g., the computing device 101 illustrated in FIG. 1) can include a plurality of memory units (e.g., the memory dice 327 illustrated in FIG. 3) and a controller (e.g., the controller 100 and/or 200 illustrated in FIGS. 1 and 2, respectively) coupled to the plurality of memory units via a plurality of channels (e.g., the channels 125 and/or 225 illustrated in FIGS. 1 and 2, respectively). The controller can be configured to exchange a user data block (UDB) (e.g., the UDB 323 and/or 423 illustrated in FIGS. 3 and 4, respectively) via a plurality of data pins of a first number of memory units (e.g., the memory dice 327-1, . . . , 327-8 illustrated in FIG. 3) of the plurality of memory units. The controller can be further configured to exchange, via a plurality of data pins of a second memory unit (e.g., the memory die 327-9 illustrated in FIG. 3) of the plurality of memory units, auxiliary data including error detection information (e.g., CRC data generated at the CRC encoder 213-1) to perform an error detection operation (e.g., CRC check) on the UDB. The controller can be further configured to exchange, via a plurality of data pins of a third memory unit (e.g., the memory die 327-10 illustrated in FIG. 3) of the plurality of memory units, a parity data block (PDB) (e.g., the PDB 339 illustrated in FIG. 3) to perform an error recovery operation (e.g., the RAID operation 452 illustrated in FIG. 4) on the UDB.

In some embodiments, the plurality of data pins of the first number of memory units, the second memory unit, and the third memory unit correspond to data input/output (DQ) pins. In some embodiments, the controller can be configured to exchange the UDB, the error detection information, or the PDB at a rate of four bits per beat.

In some embodiments, the second memory unit can correspond to one double data rate (DDRx) channel (e.g., the channel 125 and/or 225 illustrated in FIGS. 1 and 2, respectively) and the third memory unit can correspond to a different DDRx channel (e.g., the channel 125 and/or 225 illustrated in FIGS. 1 and 2, respectively). In some embodiments, the controller can be configured to exchange 64 bytes of the UDB via the plurality of data pins of the first number of memory units. The controller can be further configured to exchange 64 bits of the auxiliary data via the plurality of data pins of the second memory unit.

Figure 5:
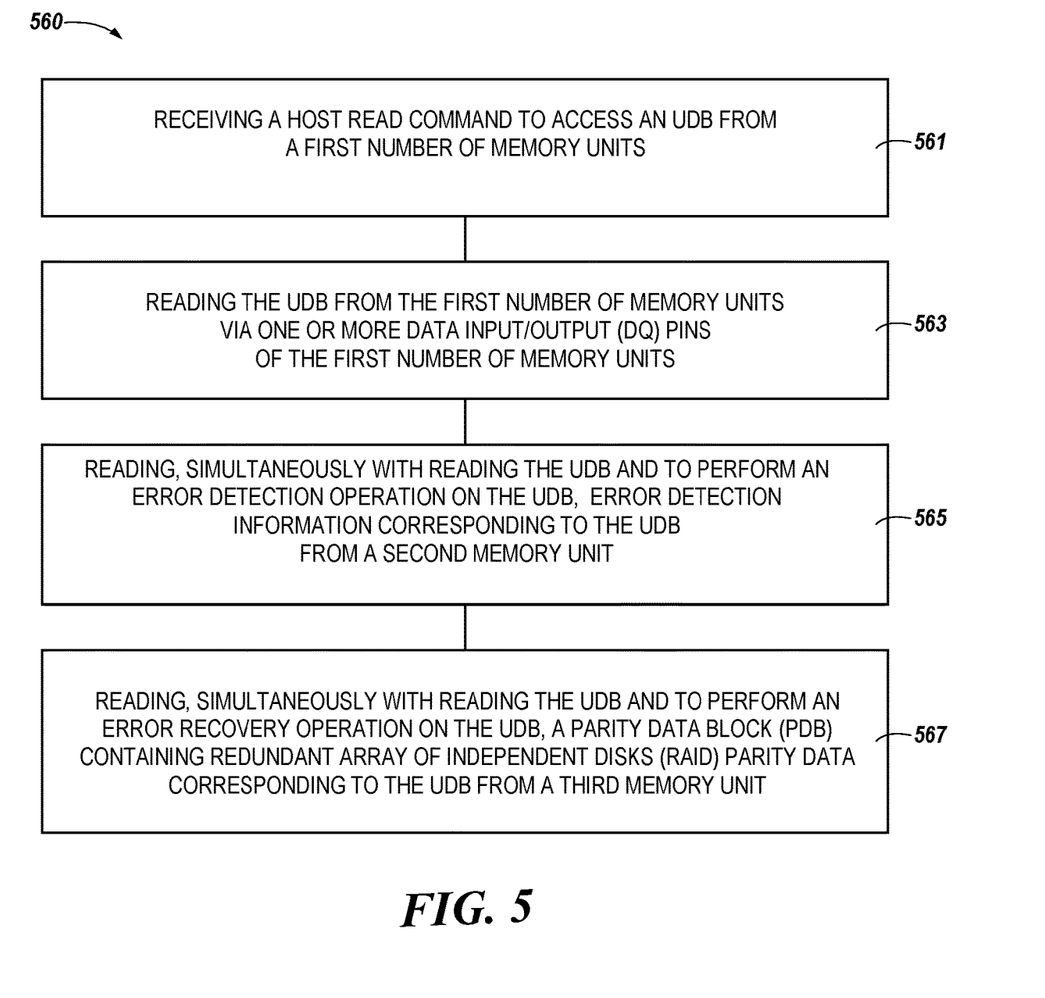
FIG. 5 is a flow diagram of a method for performing a RAID in accordance with a number of embodiments of the present disclosure.

FIG. 5 is a flow diagram of a method for performing a RAID in accordance with a number of embodiments of the present disclosure. The method 560 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 560 is performed by the memory controller 100 and/or 200 illustrated in FIGS. 1 and 2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 561, a host read command to access an UDB (e.g., the UDB 323 and/or 423 illustrated in FIGS. 3 and 4, respectively) from a first number of memory units (e.g., the memory dice 327-1, . . . , 327-8 illustrated in FIG. 3) can be received. At 563, the UDB can be read (alternatively referred to as "transferred") from the first number of memory units via one or more data input/output (DQ) pins of the first number of memory units.

At 565, error detection information corresponding to the UDB can be read simultaneously with reading the UDB from a second memory unit (e.g., the memory die 327-9 illustrated in FIG. 3) of the plurality of memory units. In some embodiments, authentication data (e.g., CRC data generated at the CRC encoder 213-1) generated based on the UDB can be read from the second memory unit of the plurality of memory units along with the error detection information and simultaneously with reading the UDB. In this example, the UDB that was encrypted prior to being stored to the first number of memory units can be decrypted and an authentication operation can be performed on the UDB responsive to the UDB being decrypted.

At 567, a parity data block (PDB) (e.g., the PDB 339 illustrated in FIG. 3) containing redundant array of independent disks (RAID) parity data corresponding to the UDB can be read simultaneously with reading the UDB from a third memory unit (e.g., the memory die 327-10 illustrated in FIG. 3) of the plurality of memory units In some embodiments, the UDB, error detection information, and PDB can be read respectively from each memory unit of the first number of memory units, the second memory unit, and the third memory unit at a rate of four bits per beat (e.g., ×4 mode).

In some embodiments, an error detection operation (e.g., CRC check) can be performed on the UDB using the error detection information to indicate whether the UDB includes a number of errors. An error recovery operation (e.g., the RAID operation 452 illustrated in FIG. 4) can be performed on the UDB using the RAID parity data of the PDB to recover the UDB and responsive to the error detection operation indicating the number of errors in the UDB. Performance of the error recovery operation can be bypassed responsive to the error detection operation not indicating the number of errors in the UDB.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a first number of memory units configured to store a user data block (UDB) corresponding to a unit of host access;
a second number of memory units that are simultaneously accessible with the first number of memory units and configured to store auxiliary data corresponding to the UDB and comprising at least authentication data for protection of data integrity and authenticity of the UDB; and
a third number of memory units that are simultaneously accessible with the first number of memory units and the second number of memory units and configured to store parity data corresponding to the UDB.

2. The apparatus of claim 1, wherein the parity data corresponds to redundant array of independent disks (RAID) parity data to recover a subset of the UDB corresponding to one memory unit of the first number of memory units.

3. The apparatus of claim 1, wherein each memory unit of the first, the second, or the third number of memory units is configured to transfer four bits of data per each beat.

4. The apparatus of claim 1, wherein:
a first portion of the first number of memory units corresponds to one double data rate (DDRx) channel; and
a second portion of the first number of memory units corresponds to a different DDRx channel.

5. The apparatus of claim 1, wherein the apparatus comprises a Compute Express Link (CXL)-compliant memory system that includes the first, the second, and the third number of memory units.

6. The apparatus of claim 5, wherein the memory system is configured to operate according to a CXL 3.0 protocol.

7. The apparatus of claim 1, wherein the auxiliary data further comprises error detection information generated based on the UDB.

8. The apparatus of claim 7, wherein the error detection information corresponds to cyclic redundancy check (CRC) data.

9. The apparatus of claim 1, wherein the authentication data comprises authentication code (MAC) data.

10. The apparatus of claim 1, wherein each memory unit of the first number of memory units, the second memory unit, and the third memory unit corresponds to a memory die.

11. An apparatus, comprising:
a plurality of memory units; and
a controller coupled to the plurality of memory units via a plurality of channels, the controller configured to:
exchange a user data block (UDB) via a plurality of data pins of a first number of memory units of the plurality of memory units;
exchange, via a plurality of data pins of a second memory unit of the plurality of memory units, auxiliary data including error detection information simultaneously with the UDB to perform an error detection operation on the UDB; and
exchange, via a plurality of data pins of a third memory unit of the plurality of memory units, a parity data block (PDB) to perform an error recovery operation on the UDB simultaneously with the UDB and the auxiliary data.

12. The apparatus of claim 11, wherein the plurality of data pins of the first number of memory units, the second memory unit, and the third memory unit correspond to data input/output (DQ) pins.

13. The apparatus of claim 11, wherein the controller is configured to exchange the UDB, the error detection information, or the PDB at a rate of four bits per beat.

14. The apparatus of claim 11, wherein:
the second memory unit corresponds to one double data rate (DDRx) channel; and
the third memory unit corresponds to a different DDRx channel.

15. The apparatus of claim 11, wherein the controller is configured to:
exchange 64 bytes of the UDB via the plurality of data pins of the first number of memory units;
exchange 64 bits of the auxiliary data via the plurality of data pins of the second memory unit.

16. A method, comprising:
receiving a host read command to access an UDB from a first number of memory units;
reading the UDB from the first number of memory units via one or more data input/output (DQ) pins of the first number of memory units;
reading, simultaneously with reading the UDB and to perform an error detection operation on the UDB, error detection information corresponding to the UDB from a second memory unit; and
reading, simultaneously with reading the UDB and the error detection information and to perform an error recovery operation on the UDB, a parity data block (PDB) containing redundant array of independent disks (RAID) parity data corresponding to the UDB from a third memory unit.

17. The method of claim 16, further comprising reading the UDB, error detection information, and PDB respectively from each memory unit of the first number of memory units, the second memory unit, and the third memory unit at a rate of four bits per beat.

18. The method of claim 16, further comprising reading, along with the error detection information and simultaneously with reading the UDB and from the second memory unit of the number of memory units, authentication data generated based on the UDB.

19. The method of claim 18, wherein the UDB is encrypted prior to being stored to the first number of memory units, and the method further comprises:
decrypting the UDB; and
performing, responsive to the UDB being decrypted, an authentication operation on the UDB.

20. The method of claim 16, further comprising:
performing an error detection operation on the UDB using the error detection information to indicate whether the UDB includes a number of errors;

performing an error recovery operation on the UDB using the RAID parity data of the PDB to recover the UDB and responsive to the error detection operation indicating the number of errors in the UDB; and bypassing performance of the error recovery operation responsive to the error detection operation not indicating the number of errors in the UDB.

\* \* \* \* \*